June 20, 1961  O. H. BANKER  2,989,599
AUTOMATIC OVERDRIVE AND TRANSMISSION SYSTEM
Original Filed Sept. 8, 1951  5 Sheets-Sheet 1
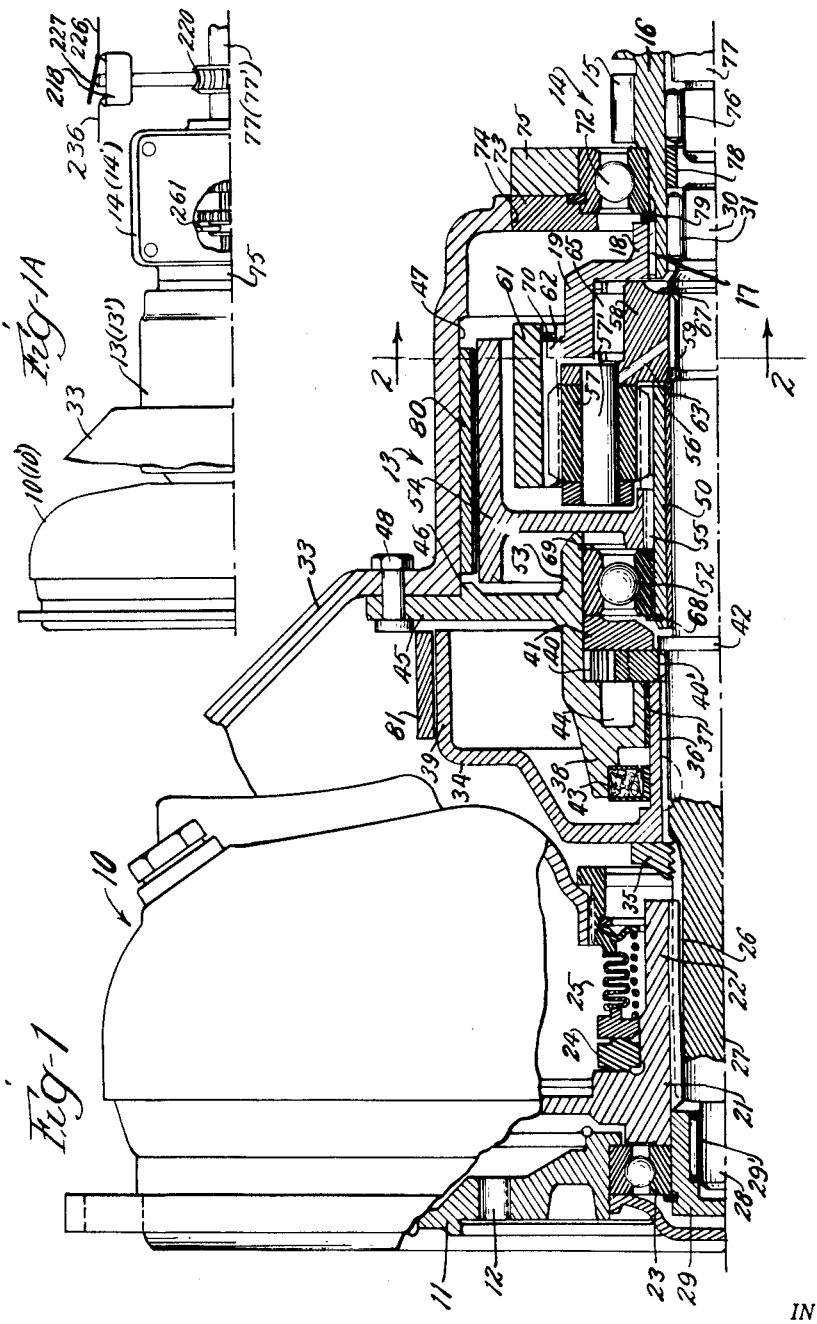
INVENTOR.
Oscar H. Banker
BY
Cromwell, Greist + Warden
Attys.

June 20, 1961   O. H. BANKER   2,989,599
AUTOMATIC OVERDRIVE AND TRANSMISSION SYSTEM
Original Filed Sept. 8, 1951   5 Sheets-Sheet 2
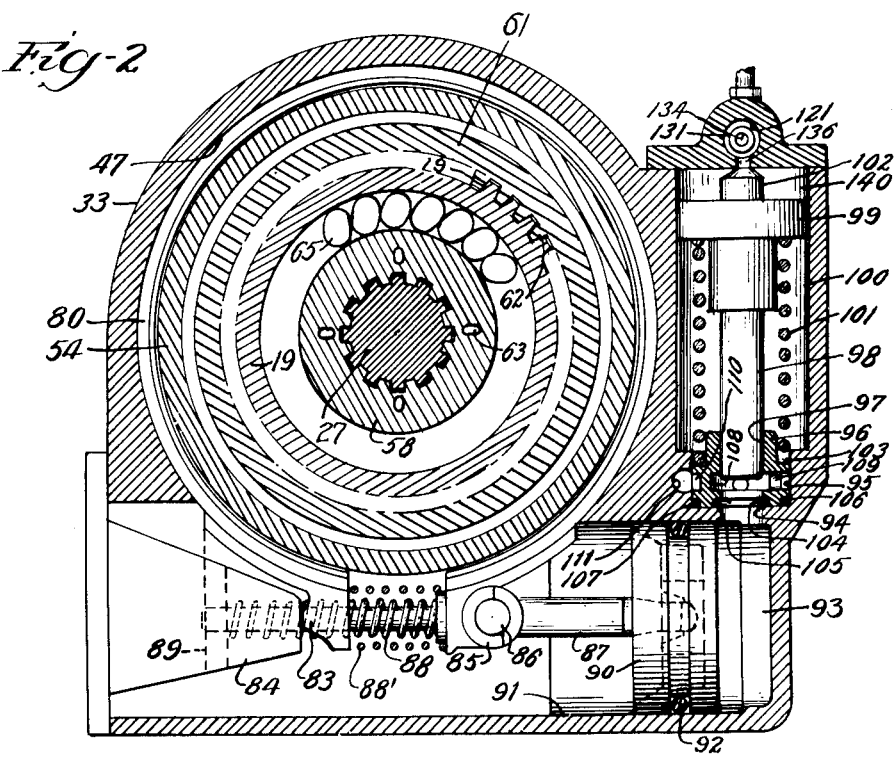
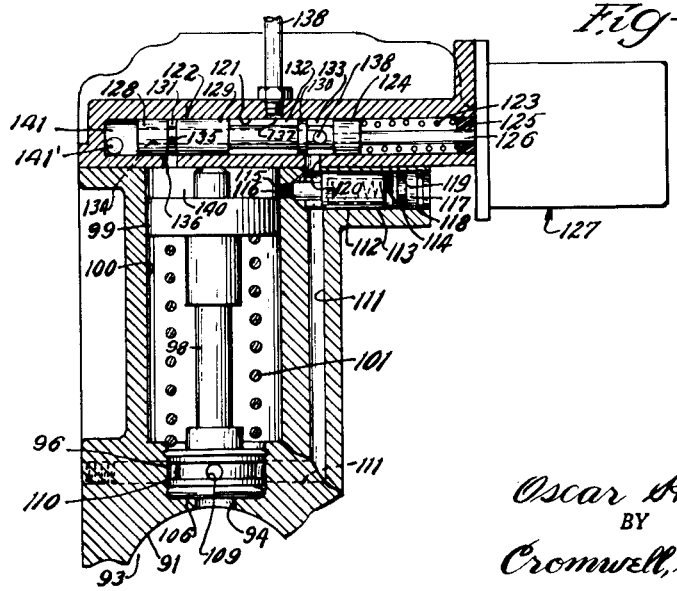
INVENTOR.
Oscar H. Banker
BY
Cromwell, Greist & Warden
Attys.

June 20, 1961     O. H. BANKER     2,989,599
AUTOMATIC OVERDRIVE AND TRANSMISSION SYSTEM
Original Filed Sept. 8, 1951     5 Sheets-Sheet 3
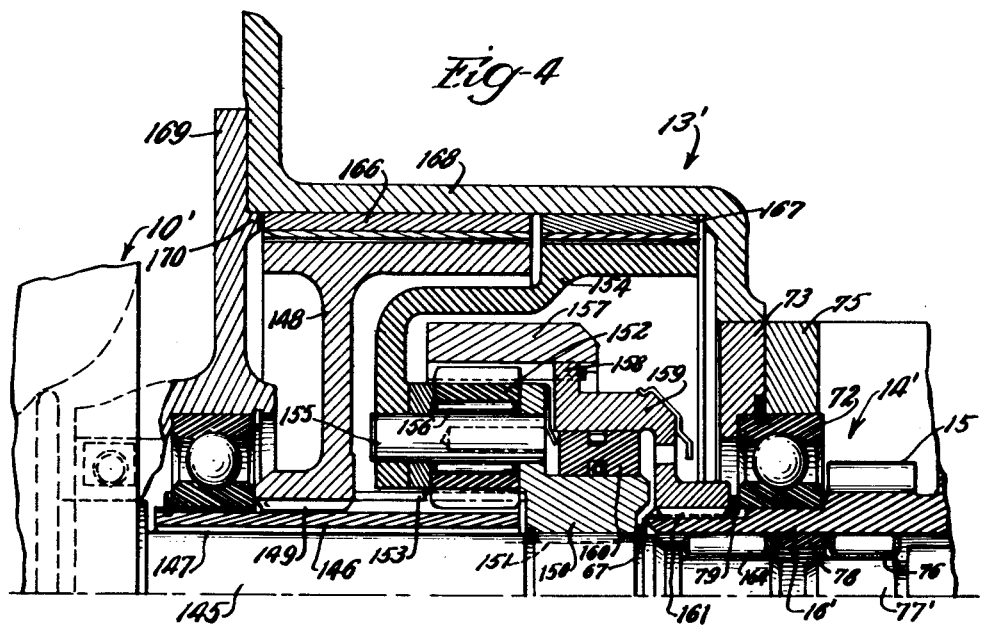
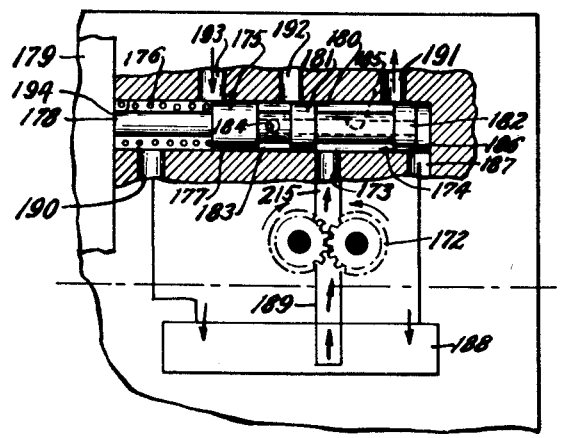
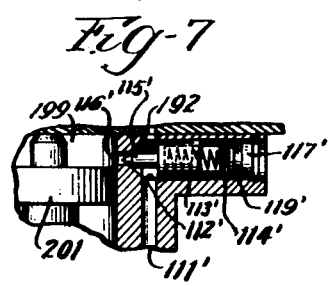
INVENTOR.
Oscar H. Banker
BY
Cromwell, Greist & Warden

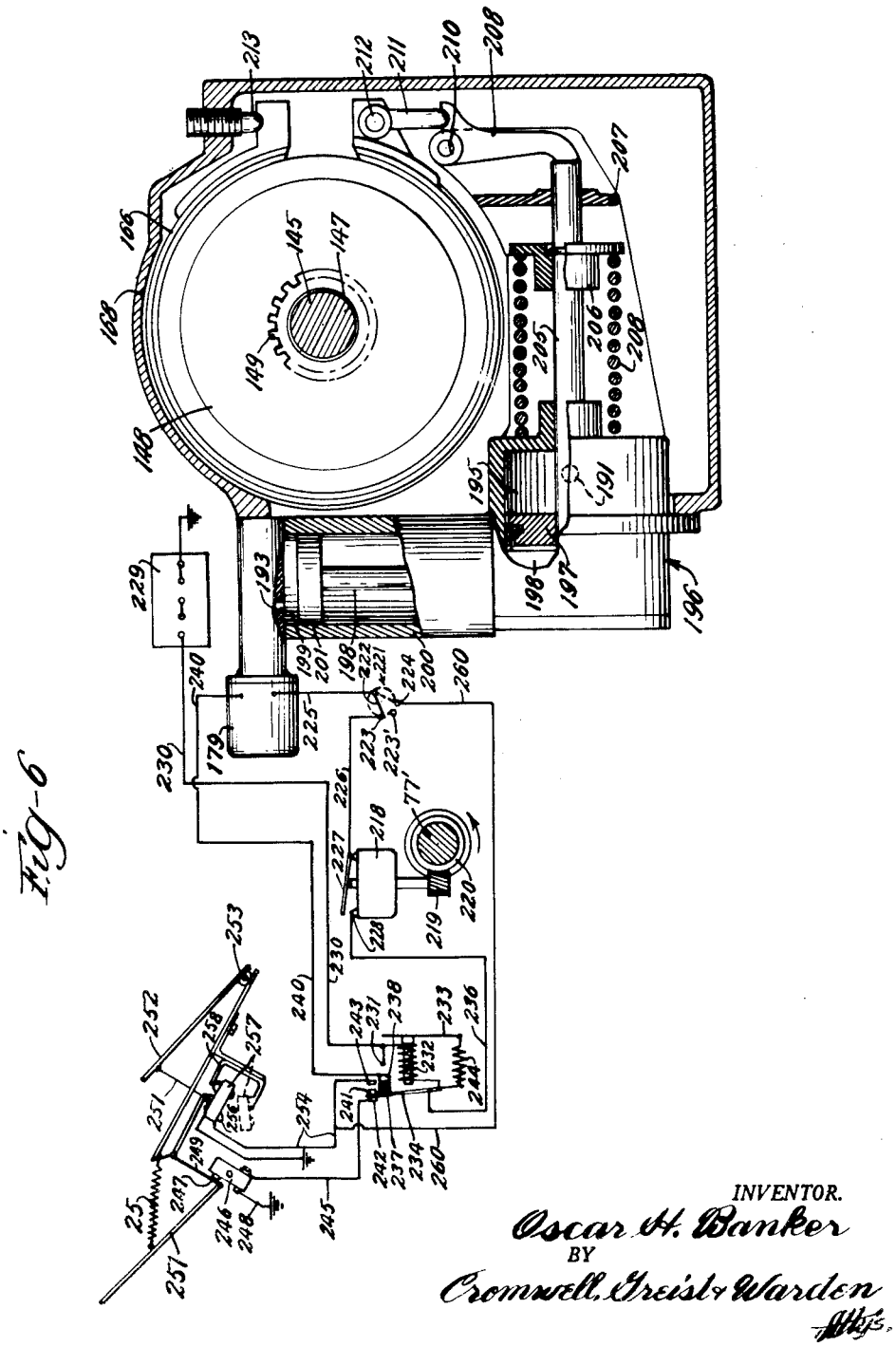

June 20, 1961  O. H. BANKER  2,989,599
AUTOMATIC OVERDRIVE AND TRANSMISSION SYSTEM
Original Filed Sept. 8, 1951  5 Sheets-Sheet 5
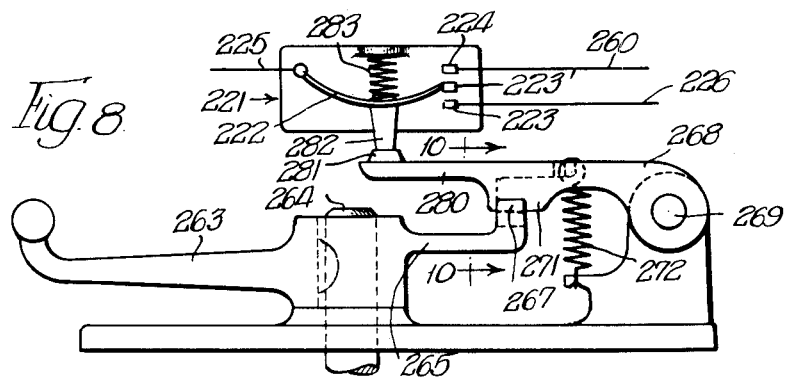
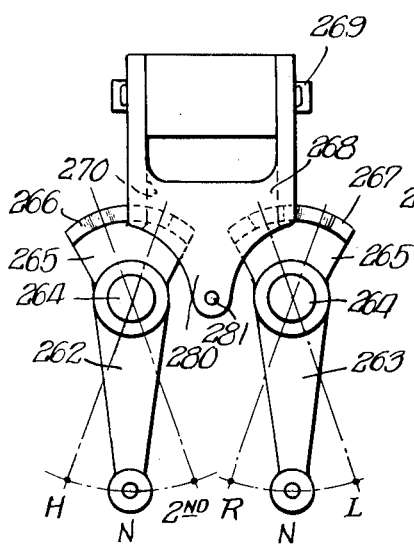
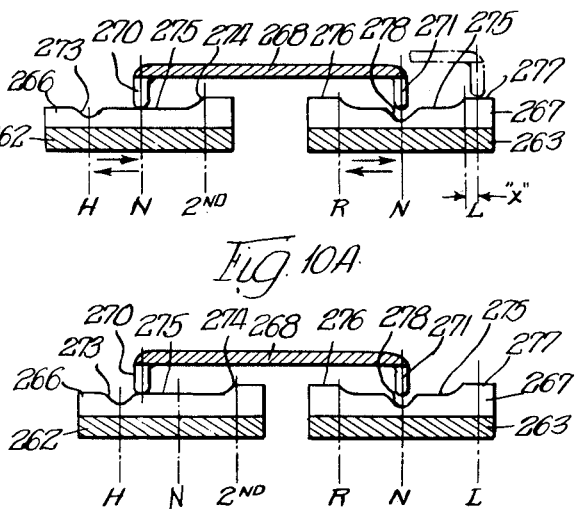
INVENTOR.
Oscar H. Banker,
BY
Cromwell, Greist + Warden
Attys.

United States Patent Office

2,989,599
Patented June 20, 1961

2,989,599
AUTOMATIC OVERDRIVE AND TRANSMISSION SYSTEM
Oscar H. Banker, Evanston, Ill., assignor, by mesne assignments, to Fawick Corporation, Cleveland, Ohio, a corporation of Michigan
Original application Sept. 8, 1951, Ser. No. 245,721, now Patent No. 2,774,256, dated Dec. 18, 1956. Divided and this application Jan. 4, 1956, Ser. No. 557,407
11 Claims. (Cl. 200—6)

The present invention relates to improvements in an automobile drive system or assembly featuring the combination in an improved manner of an improved planetary type overdrive unit, a manually controlled multiple speed transmission, and a fluid coupling or related type of clutch device. The invention has as its general object the provision of a combination of the above sort in which it is possible to obtain, fully automatically, a multiplication of the number of speed ratios normally afforded in a conventional installation involving related units, and, moreover, to do this in a fashion which permits manual operation of the transmission at all times.

A more specific object is to provide an installation including a planetary type overdrive unit associated in a novel manner with a multi-speed transmission, preferably of the "synchromesh" type, and with a fluid coupling or equivalent coupling unit for improved conveniences and advantages in operating a vehicle featuring the installation, particularly when the vehicle is not moving.

Yet another object is to provide an installation as set forth in the preceding paragraph in which operation of certain automatic control means for the overdrive unit is automatically effected in part by manipulation of the usual selector of the transmission and in part by manipulation of the usual throttle pedal of the vehicle.

It is another object of the invention to provide a combined planetary overdrive-change speed transmission assembly of the foregoing character which has improved provisions for substantially automatically changing from a low speed direct ratio in the planetary unit to a higher speed overdrive ratio, preferably in which the time for changeover in ratio is at all times under the control of the operator of a vehicle powered by the assembly, rather than being effected solely through an arbitrarily acting governor or equivalent element.

A still further object is to provide an assembly of the above sort featuring an improved overdrive unit employing planetary sun and orbit members in conjunction with an overrunning clutch, in which a low speed ratio is obtained by a direct shaft drive through the clutch and the overdrive train is through the planetary members while the clutch overruns, together with improved means for controlledly, and primarily automatically, governing these actions in accordance with the speed of travel of the vehicle.

Yet another object is to provide a planetary overdrive unit of the above type in which control of operation of the overdrive unit is effected by an improved hydraulic system, featuring an improved pressure intensifier or booster arrangement enabling the unit to be operated by a low pressure hydraulic source.

Another object of the invention is to provide, in a hydraulically controlled overdrive system, preferably of planetary overrunning clutch type as set forth above, improved means for supplying operating liquid from a low pressure source to a hydraulic unit which controls the overdrive, including a supply and booster unit by which the hydrauilc control for the system is initially operated under the low pressure of the source, such as the usual engine lubricating pump or a small pump specially built into the installation, and is finally operated under a substantially increased pressure supplied by the booster in a novel manner.

Yet another object is to provide an improved hydraulic supply and booster unit of the sort referred to above.

A more specific object is to provide a hydraulic control unit for a planetary type overdrive unit or the like, including a solenoid operated valve controlling the flow of operating fluid from a low pressure source to a mechanism which operates the unit, and a hydraulic booster plunger and cylinder associated with the valve and mechanism in an improved manner to materially increase the pressure acting upon the latter following initial operation of the operating mechanism directly from the low pressure source.

A still further object is to provide a system or installation as described in the preceding paragraph, which features an improved, electrical control arrangement for the hydraulic operating unit of the overdrive, whereby the placing of the latter in overdrive ratio in response to operation of a governor is primarily subject to control by the operator of the vehicle, rather than being arbitrarily and solely in accordance with speed of travel of the vehicle.

The foregoing statements are indicative in a general way of the nature of the invention. Other and more specific objects will be apparent to those skilled in the art upon a full understanding of the construction and operation of the device.

Two embodiments of the invention are presented herein for purpose of illustration and it will be appreciated that the invention may be incorporated in other modified forms coming equally within the scope of the appended claims.

In the drawings:

FIG. 1 is a view mainly in vertical section through the axis of a fluid coupling-planetary overdrive-multiple speed transmission system in accordance with one embodiment of the invention, showing particularly details of construction of the overdrive unit thereof;

FIG. 1A is a conventionalized view in elevation showing in a general way the improved arrangement of fluid coupling or clutch unit, overdrive unit and transmission unit which is contemplated by the invention, this view being partially broken away at the transmission unit to show selector elements thereof;

FIG. 2 is a view in transverse vertical section, approximately on line 2—2 of FIG. 1, through a portion of the planetary overdrive unit, showing the arrangement of a hydraulic brake actuating planger for the latter and an intensifier or booster unit for the actuating plunger;

FIG. 3 is a fragmentary view in transverse vertical section through the booster unit referred to;

FIG. 4 is a fragmentary view in axial section through a coupling driven overdrive-transmission arrangement in accordance with a modified, simplified and more compact adaptation of the invention;

FIG. 5 is a fragmentary elevational view of schematic character showing a hydraulic pressure supply and control arrangement for a brake actuating plunger controlling the overdrive unit shown in FIG. 4 (also applicable to the installation of FIGS. 1 and 2), this view being partially broken away and in vertical axial section;

FIG. 6 is a view which is partially schematic and conventionalized, illustrating the hydraulically operated overdrive unit of FIGS. 4 and 5 as operatively associated with an electrical, governor controlled operating system for that unit;

FIG. 7 is a fragmentary view in axial section showing a detail of the hydraulic booster and actuating device which is further illustrated in FIGS. 5 and 6;

FIG. 8 is a somewhat conventionalized view in side elevation illustrating a proposed device for automatically actuating a control switch of a governor regulated solenoid circuit, shown in FIG. 6, through manual operation of a selector or selectors of the transmission unit of the present system;

FIG. 9 is a plan view showing certain cam and lever operating elements to the device of FIG. 8, and indicating the manner in which the same are manipulated in the shifting of gears to different ratios, to correspondingly control the governor circuit; and FIGS. 10 and 10A are schematic views, which may be considered to be in section on line 10—10 of FIG. 8, further illustrating the operation of the switch control means in various positions of the transmission selector levers.

Referring to FIGS. 1 and 1A of the drawings, the present system or assembly is made up of three main components. The first of these is a fluid coupling unit 10 of generally conventional character, having a flange 11 at the left hand side thereof which is adapted to be attached to a crank shaft flange or spider (not shown) by bolts applied to tapped holes 12. The second unit is a hydraulically controlled, planetary type overdrive unit, generally designated 13, and the third unit is a conventional manually controlled three-speed synchromesh transmission, generally designated 14, such as the type T–96 unit produced by Warner Gear Division of Borg-Warner Corporation. In view of the conventional character of the unit 14 I have only illustrated specifically in FIG. 1 an input pinion 15 on the tubular input shaft 16 thereof.

FIG. 1A shows the general arrangement, in which the overdrive unit 13 is disposed between the engine driven coupling 10 and transmission 14. This arrangement is an improved one enabling operating advantages over existing systems as will be described. If desired, fluid coupling 10 may be replaced, in either of the illustrated embodiments, by equivalent coupling means, such as a centrifugal clutch, to further reduce the cost of the system, as will be described.

Shaft 16 is splined at 17 to the extended hub 18 of an output member 19 of the planetary overdrive unit 13.

The reference numeral 21 appearing toward the left hand side of FIG. 1 designates a tubular output shaft of the fluid coupling unit 10. It is equipped with an elongated, axially extending hub 22, and is piloted on a bearing 23 mounted internally of coupling flange 11. Hub 22 is provided with a standard carbon type seal 24 and compressible metal bellows 25 or its equivalent to seal the hub from the atmosphere. Hub 22 is provided with internal splines 26 which drivingly engage the same with a main planetary shaft 27; and this shaft has a reduced diameter left hand end 28 which is piloted by an end cap 29 and a needle bearing 29' within the bearing 23.

The opposite end of main planetary shaft 27 is also reduced in diameter at 30, and is piloted by a roller bearing 31 within the tubular input shaft 16 of synchromesh transmission unit 14.

A brake drum 34 is keyed to main shaft 27 externally of fluid coupling 10 and within a bell housing 33 which encloses operating parts of the planetary overdrive unit 13. A nut 35 is applied to the shaft for a purpose to be described. The drum 34 has an axially extending hub 36 which is journaled by a bushing 37 in a shaped pump housing 38 located within the axially extending rim of the drum 34.

The reference numerals 40, 40' designate the gear and rotor of an internal gear pump mounted concentric with shaft 27, and the reference numeral 41 denotes an end member which completes the pump housing. This end member surrounds an enlarged integral shoulder 42 on shaft 27, and nut 35 acts to urge hub 36 of drum 34 and the pump rotor 40' against end shoulder 42. An appropriate seal 43 seals the interior of pump housing 38, to which hydraulic pressure liquid is admitted through an intake port 44.

Housing 38 has a radially extending flange 45 of substantial size and an integral annular shoulder 46 on flange 45 serves to pilot the pump housing within the left hand end of a cylindrical bore 47 of bell housing 33. Flange 45 is fixedly secured to housing 33 by bolts 48.

A sleeve 50 surrounds main planetary shaft 27 immediately to the right of the pump housing 38 and shaft shoulder 42, the sleeve being journaled by a ball bearing 52 in an integral right hand extension 53 on pump housing flange 45. Sleeve 50 is externally splined at 55 to key the same to a drum 54. It also carries a sun gear 56 meshing with planetary pinions 57 which are rotatably mounted by pins 57' on a planetary carrier 58. Carrier 58 is splined at 59 on a reduced diameter intermediate portion of shaft 27. Planetary pinions 57 also mesh with the internal teeth of a ring or orbit gear 61, and the teeth of this orbit gear engage external teeth 62 formed on the previously described output member 19 of planetary overdrive unit 13.

Planetary carrier 58 is drilled at 63 for lubrication and its outer peripheral surface at the right hand side thereof is hardened to serve as an inner race of a sprag type clutch, the hardened sprags of which are designated 65. The outer race of the clutch is constituted by the machined and hardened inner peripheral surface of the planetary output member 19.

A snap ring 67 holds the planetary carrier 58 axially in place on shaft 27 to which it is splined. Likewise snap rings 68 and 69 hold lower ball bearing 52 in place on sleeve 50. A still further snap ring 70 holds the orbit gear 61 with relation to the output member 19 of the overdrive unit.

As stated above, the output member 10 is directly splined at 17 to the manually controlled synchromesh transmission unit 14. Input shaft 16 of this unit is mounted by a ball bearing 72 in the casing 75 of transmission unit 14, which casing is properly located with respect to the bell housing of planetary unit 13 by engagement with a plate 73 in the end wall of the bell housing 33. The outside diameter of plate 73 is accurately machined to fit within the right hand end bore 74 of the bell housing.

A roller bearing 76 in the bore of tubular transmission shaft 16 supports the output shaft 77 of the transmission 14, whose input pinion 15 is carried on the exterior of shaft 16. A spacer ring 78 separates the two bearings 31 and 76 for the main planetary shaft 27 and transmission output shaft 77, respectively, and a snap ring 79 serves to locate the input shaft 16 and pinion 15 in proper relation to the ball bearing 72.

An overdrive controlling brake band 80 is mounted in the bore 47 of bell housing 33, in surrounding relation to the drum 54, and the function of this brake band will be hereinafter described. A brake band 81 is also positioned about the first described drum 39.

When fluid coupling 10 is driven by the engine its output shaft 21 will drive main shaft 27 through the splined connection 26. Pump impeller 40' is thus driven to commence building up hydraulic pressure for use at the proper time. Shaft 27 also rotates the planetary carrier 58 and, through the one-way drive action of sprags 65, the output member 19 of the overdrive unit 13. A direct, one to one drive of the transmission unit 14 thus takes place through splines 17 and input pinion 15 of the latter. This is the line of power transmission for a low speed phase of operation of planetary overdrive unit 13.

In order to initially engage the synchomesh transmission, particularly in the event the vehicle was in high gear or other gear train when stopped, the main shaft 27 must be held from a normal floating movement due to hydraulic action in the coupling 10. Of course, if a centrifugal clutch is substituted for the fluid coupling this tendency is not present, so that the means to counteract the same in the illustrated form, namely drum 34 and brake band 81, may be eliminated. In such case lock up of the centrifugal clutch is accomplished at the time the overdrive band 80 is applied.

Only very low torque is required to restrain the aforesaid floating action during the idling period of the engine. By actuating a solenoid controlled valve such as is shown and described in my Patent Nos. 2,353,137 of July 11, 1944 and 2,482,573 of September 20, 1949, or equivalent means, from any convenient place adjacent the operator, the brake band 81 is applied to drum 34 and rotates the shaft 27 slightly backward in relation to the direction of torque on unit 10. The band thus holds the drum from rotation and relieves all of the drag torque on the gear teeth in the circumstance noted.

After engagement of the low gear train of the transmission takes place, band 81 is released, whereupon pinion 15 will drive the vehicle in low speed. The overdrive constituted by sun gear 56, planetary pinions 57, orbit gear 61, and the splined connection of the latter to output member 19 is inactive.

In order to bring the unit 13 into overdrive, brake band 80 is applied to drum 54. This is preferably accomplished by means of a conventional electric governor driven by output shaft 77 at the rear end of transmission 14, as shown in FIGS. 1A and 6 and hereinafter further described. Through means of this type, and at a given predetermined speed, an automatic overdrive actuating mechanism, also to be described, will be energized to apply band 80 to the drum 54. When this occurs, sun gear 56 halts and planetary action results. Orbit gear 61 and output member 19 to which it is splined now overrun the sprag elements 65 and transmission input shaft 16 is rotated at a higher rate of speed.

In the event overrule of the overdrive through the planetary system is desired, a switch which controls the circuit for the governor actuated solenoid may be broken by depressing the accelerator pedal past its wide open position. This will de-energize the actuating mechanism, referred to above, controlling brake band 80, whereupon clutch sprags 65 will resume a direct driving relation to output member 19. Just as soon as the accelerator is allowed to return, brake band 80 will be re-engaged, assuming a proper speed obtains, and overdrive resumed.

The automatic overdrive brake actuating mechanism referred to above is constituted by a solenoid controlled hydraulic valve governing pressure supplied by pump rotor 40'. The latter is at this time running fast enough to generate all the pressure needed, which, due to the further provisions to be described, is a relatively low one.

With the foregoing explanation of the general operation of the proposed planetary overdrive and transmission system, the automatic provisions, involving a solenoid controlled valve, for effecting hydraulic control of the planetary system by actuating brake band 80, may now be considered.

In this connection, it is desirable that a low pressure hydraulic supply be used for easy maintenance of the equipment quiet operation of the same, and diminished power consumption. Hydraulic transmissions in use at the present operate with a pressure of upwards of 80 to 150 pounds, which is as low as has been found practical. However, the illustrated system operates on a much lower oil pressure and, in employing a hydraulic servo-mechanism which bears directly on the brake band 80, eliminates the need for levers and/or links to extend the travel of a hydraulic piston associated therewith. As a result periodic adjustment of the band for wear is unnecessary. The hydraulic control system referred to is illustrated in FIGS. 2 and 3 of the drawings.

As shown in FIG. 2, the brake band 80 is mounted snugly in the bore 47 of bell housing 33. One end thereof has a shaped shoulder 83 fixed thereon which rides the face of a block 84 mounted in fixed relation to the housing. The opposite end of the brake band is provided with an arcuate seat 85 which straddles a pin 86 carried by a plunger rod 87. A coiled, plunger return spring 88 surrounds an extension of rod 87, the spring acting between the seat 85 and the plunger guide rod 89. A lighter coil spring 88' acts to spread the ends of the band and afford proper clearance between the band and drum 54. Proper initial clearance may be had by an adjustment of block 84, by the use of a shim, or the like. Rod 87 abuts a disk type plunger 90 which slides in a cylinder 91 formed in the bell housing, this plunger being sealed with relation to the cylinder walls by means of an O-ring 92 seated in a groove about the periphery of the plunger. A pressure chamber 93 in cylinder 91, to the right of plunger 90, has a right angle bore 94 opening thereto and to an enlarged counterbore 95 in which a cylinder intake control member 96 is disposed. The bore 94 and an axially aligned bore 97 of the same diameter in member 96 slidably receive a reduced diameter booster or intensifier plunger 98. The latter has an enlarged piston head 99 on the upper end thereof. Piston head 99 slides in an enlarged, vertically disposed booster cylinder 100. A coil spring 101 acts between the head 99 and the intake member 96 to urge the former upwardly, and a reduced diameter upper extension 102 on the head limits upward movement of plunger 98 in cylinder 100. This extension is an integral part of the piston head 99.

Intake control member 96, in which the plunger 98 is slidably guided, is held in place in counterbore 95 by a snap ring 103. The lower end of member 96 is internally relieved at 104 to provide an annular groove in which an O-ring 105 is disposed for sealing engagement with the lower end of booster plunger plunger 98. The lower end of the member is likewise externally relieved at 106 to provide an external groove receiving an O-ring 107 which seals the member 96 externally with relation to counterbore 95. A further enlarged internal annular groove 108 is formed in intake member 96, opening inwardly to the bore 97 thereof, and radial ports 109 communicate this groove with an external annular groove 110 in the member. Groove 110 in turn communicates with a passage 111 in the bell housing 33.

As shown in FIG. 3, the passage 111 is in direct communication with a horizontal cylinder or plunger bore 112 formed in the housing or in a fixedly associated part, and a plunger valve 113 is slidably received in bore 112. Valve 113 is urged by a coil spring 114 to engage its reduced conical forward nose 115 with a port 116 which opens laterally to the upper portion of the booster cylinder 100. A plug 117 held in place by snap ring 118 closes the plunger valve bore 112, and O-ring 119 applied to the plug seals bore 112 from the atmosphere.

The space between plunger valve 113 and plug 117 is suitably communicated by a duct (not shown) with an oil reservoir or sump supplying oil to the intake 44 of pump housing 38, shown in FIG. 1. This takes care of the drainage of oil accumulated behind the valve.

A passage 120 in alignment with passage 111 communicates plunger valve bore 112 with an elongated cylindrical valve chamber 121 disposed horizontally thereabove, and a cylindrical valve spool, generally designated 122, is slidably mounted in chamber 121. The spool is urged toward the left by a coil spring 123 acting between an enlarged cylindrical portion 124 of the spool and an abutment and guide plug 125 fixed in the right hand end of bore 121. A stem 126 secured to the enlarged valve spool portion 124 passes through the guide 125 and is secured to the armature of an electrical solenoid, generally designated 127.

Valve spool 122 has an enlarged forward nose 128 of axial length approximating that of portion 124, a somewhat longer intermediate barrel portion 129, and a shoulder 130 of reduced width between portions 124 and 129. These portions divide the spool into three grooves, namely a first groove 131 of relatively slight axial width, an intermediate groove 132 of extended axial width, and a third groove 133 of intermediate axial width. The valve spool has a hollow axial bore 134 and a small opening 135 communicates the first groove 131 with this internal bore.

Groove 131 is adapted to communicate with an exhaust port 136 which opens from the valve spool chamber 121 to the upper portion 140 of plunger cylinder 100. See FIGS. 2 and 3. The intermediate, axially elongated groove 132 opens to the exterior of the housing through an external, pressure delivery port 137. The third groove 133 is communicated with plunger valve bore 112 by the passage 120 described above, while a radial hole 138 in the valve spool communicates the groove 133 with its internal bore 134.

The external port 137 described above is a hydraulic pressure delivery port and it is connected by a suitable pressure duct or line 138 with the discharge of the gear pump (FIG. 1). Valve spool 122 is shown in an exhaust position in FIG. 3 of the drawing, in which the longest groove 132 registers with the delivery port 137 and the groove 131 registers with port 136 opening to the pressure chamber 140 above the head 99 of booster plunger 98. Groove 133 then is in communication with passage 120 and plunger bore 112, and the lateral port 116 to pressure chamber 140 is sealed off by the nose 115 of plunger valve 113. An exhaust chamber 141 in valve spool bore, at the left hand end of spool 122, is communicated by a passage 141' with the sump of the pump, so that fluid exhausted from chamber 140 may pass through passage 136, groove 131, radial opening 135 and internal bore 134 of the valve spool to the sump. Fluid from brake actuating plunger chamber 93 exhausts, in this position of the parts, through bore 94, intake member 96 and radial passage 109 and groove 110 of the latter, passage 111, plunger valve bore 112, passage 120, groove 133 and radial hole 138 to the internal bore 134 of spool valve 122, whence it also passes out through the left hand end of the spool to exhaust chamber 141 and to the sump.

The brake band 80 is set against drum 54 in a firm and rigid manner, under a multiplication of the available hydraulic pump pressure, when the transmission driven governor referred to above causes solenoid 127 to be energized, thus drawing valve spool 122 to the right, as viewed in FIG. 3, against the resistance of spring 123. This causes the enlarged, left hand end portion 128 of the spool to close off the exhaust port 136 from booster cylinder pressure chamber 140. At the same time the passage 120 opening plunger valve bore 112 to valve spool chamber 121 is removed from communication with spool groove 133 and radial exhaust port 138 and is placed in communication with the intermediate, elongated groove 132. Groove 132 is in constant communication with the pump delivery port 137.

Low hydraulic pressure is now communicated from pump housing 38 through conduit 138, port 137, groove 132, passage 120, plunger valve bore 112, passage 111, and through the intake member 96 to plunger pressure chamber 93. This pressure, although much less than that commonly resorted to in existing installations, is sufficient to shift plunger 90 to the left, as viewed in FIG. 2, and to bring the brake band 80 into contact with drum 54.

Naturally, as plunger 90 is moving to the left the pressure in chamber 93 reduces until the travel of the plunger stops upon initial application of the brake band to the drum. When the plunger is fully stopped, the pressure in chamber 93, passage 111 and plunger valve bore 112 again rises to full pump pressure. The spring 114 which controls plunger valve 113 is chosen of such force that it holds the plunger valve 113 in closing relation to the lateral port 116 to booster cylinder pressure chamber 140 until the full pump pressure is again reached. When this takes place, plunger valve 113 moves to the right, compressing spring 114 and opening port 116 to passage 111. Pump pressure is now effective in chamber 140 and drives booster plunger 98 downwardly. When the lower end of plunger 98 passes the internal O-ring 105 (FIG. 2), the chamber 93 becomes absolutely sealed against loss of pressure past the intake member 96. Accordingly, as the lower end of plunger 98 continues to advance into bore 94, the pressure in chamber 93 rises abruptly.

Plunger 90 is now urged toward the left under a multiplication of force represented by the differential in area of the booster plunger itself and its enlarged piston head 99. This ratio is predetermined in the design of the system whereby any desired pressure in chamber 93 may be attained. Since fluid cannot escape from chamber 93, and since pressure chamber 140 is constantly subject to the pump pressure, the high pressure in chamber 93 is maintained just as long as the circuit for solenoid 127 is maintained by the engine governor. The pressure rise in chamber 93 is sufficiently gradual to give a smooth retarding action on drum 54 and then to hold the drum from rotation.

Upon de-energization of solenoid 127, spring 123 will return the spool 122 to the left, communicating exhaust port 136 of pressure chamber 140, and passage 111, with the sump through the respective fluid flow lines, both including the internal bore 134 of spool 122, as described above. Plunger 98 again rises and plunger 90 releases brake band 80 in a manner which is apparent.

A drop of pressure in chamber 140 and passage 111 occurs immediately, accompanied by a drop of pressure in plunger bore 112, so that the plunger 113 returns to sealing engagement with the pressure supply port 116. Even though port 116 is closed, the bleeding of pressure liquid through port 136 and spool bore 134 is sufficiently rapid to insure quick disengagement of the brake band 80 from the drum, unimpeded by dashpot effect in booster cylinder 100.

The above described method of intensifying a low pressure control liquid to produce a force sufficient for holding a brake band in holding relation to a control drum relies upon the principle of building up hydraulic brake band actuating force, and then maintaining the force once the desired value has been attained. This is distinguished from the principle of replenishing high pressure from time to time. Plunger 90 will unfailingly bring the brake band 80 to operative relation to drum 54 and then build up and maintain drum holding force, regardless of the extent of wear on the band taking place over a long period of operation. No adjustment of the band is necessary to take up for wear. Once the chamber 93 is filled with low pressure operating fluid, plunger 90 will commence to move, regardless of the volumetric capacity at its right. Once band 80 has been brought into engagement with the drum, the described multiplication of force takes place regardless of the distance which has been traversed in bringing the brake band into contact with the drum.

In the embodiment of the invention illustrated in FIGS. 4, 5, 6 and 7 of the drawings, a generally similar hydraulic intensifier or booster system is employed. Modification of certain mechanical features of the overdrive unit is resorted to in the interest of increased compactness and reduced cost of manufacture. To the same ends, a separate pump, built into the overdrive unit and driven from a coupling or clutch through the main planetary shaft, has been omitted. Control of the overdrive unit of this modified form relies upon the hydraulic pressure of the engine lubrication system.

Referring to FIG. 4, the engine driven fluid coupling is here shown in dotted line and generally designated 10'. As explained above, an equivalent automatic clutch may be substituted for the fluid coupling, eliminating the need for a shaft holding brake band. A main planetary shaft 145, driven by the coupling, has a sleeve 146 mounted thereon by a bushing 147, and a brake drum 148 of a planetary overdrive unit 13' is splined at 149 on the exterior of the sleeve.

A planetary carrier 150 is keyed at 151 to the shaft 145 and journals planetary pinions 152 which mesh with teeth 153 formed on an elongated extension of sleeve 146. Planetary carrier 150 carries a second brake drum 154 in fixed relation thereto, the drum being shown as mounted on pins 155 on the planetary carrier upon which the planetary pinions 152 are rotatably mounted, in this case by a roller bearing 156. Drum 154 is shaped so that it may be telescoped axially within the axial overhand of drum 148, and the planetary carrier and associated parts to be described, are axially telescoped within drum 154.

A ring or orbit gear 157 meshes with planetary pinions 152 and is splined at 158 to a planetary output member 159. Here again, the planetary carrier 150 and output member 159 serve as inner and outer races, respectively, for the sprags 160 of an overrunning sprag type clutch, the relationship of parts being similar to that illustrated and described in connection with FIG. 1. Output member 159 is splined at 161 to the tubular input shaft 16' of a conventional three speed synchromesh transmission 14', such as that referred to in connection with the first embodiment. The input pinion of this transmission is formed integral with shaft 16' and is designated 15'. The right hand end of the main shaft 145 is roller bearing journaled at 164 in the interior of tubular shaft 16', as is an adjacent end of the transmission output shaft, designated 77' since it corresponds to shaft 77 of FIGS. 1 and 1A. Otherwise the mounting of all parts in this zone is similar to that shown in FIG. 1, hence similar reference numerals are employed to designate the same.

An overdrive control brake band 166 is disposed for engagement with drum 148 and a smaller band 167 is similarly adapted to engage drum 154. These brake bands are snugly received within a bell portion of a housing 168 of the overdrive 13' in which a flange or wall 169 associated with said housing is piloted at 170. The functioning of the arrangement illustrated in FIG. 4 is similar to that shown in FIG. 1, insofar as attainment of low speed and overdrive ratios is concerned, hence the description need not be duplicated in this regard. It is to be noted that considerably increased compactness results from the elimination of a shaft driven pump, together with pump housing and sealing provisions embodied in the form of FIG. 1. Preliminary stoppage of drum 154 is caused by application of band 167 to drum 154 as described above. The overdrive phase involving application of band 166 to drum 148 is also arrived at as described in connection with FIG. 1.

Referring to FIG. 5, the source of hydraulic pressure for control and actuation of the overdrive unit of FIG. 4, is, as stated above, the existing engine driven lubrication pump, diagrammatically illustrated in FIG. 5 and designated generally by the reference numeral 172. This pump discharged through a passage 173 to an elongated cylinder 174 in which a valve spool 175 is slidably mounted. The spool is urged to the right, as viewed in FIG. 5 (and also in FIG. 6), by a coil spring 176 which acts between an enlarged end portion 177 on the spool and a fixed abutment surface. A stem 178 on the valve spool 175 extends to the left and is secured to the armature of a solenoid (FIG. 6) which is generally designated 179.

FIG. 5 illustrates the valve spool 175 in its position when solenoid 179 is de-energized, i.e., for direct drive operation of unit 13'. In this position, pump delivery passage 173 delivers liquid under pressure to a groove 180 in the valve spool located between enlarged portions 181 and 182 of the latter. A similar groove 183 is formed between the enlarged portions 177, 181 of the spool, the latter having a radial hole 184 communicating at this zone with its hollow bore 185. An exhaust or dump chamber 186, between the enlarged forward portion 182 of the spool and the end of spool cylinder 174, communicates through an exhaust passage 187 with the sump of the pump 172, schematically shown and designated 188. An intake conduit 189 for the pump extends into this sump. The part of valve spool cylinder 174 to the rear, or left hand side, of enlarged spool portion 177 is also communicated with sump 188 through an exhaust passage 190.

Liquid under normal pump pressure is applied to a booster type brake band actuating device for planetary unit 13' which is very similar to that shown in FIGS. 2 and 3, and will be hereinafter described only in a general way. For this purpose, a passage 191 is provided (see FIG. 5) which opens to valve spool cylinder 174 adjacent the spool groove 180 when the spool is in its illustrated pressure dumping and brake releasing position. Groove 180 at this time registers both with pump delivery passage 173 and with passage 191. Further passages 192, 193 are provided which also open to spool cylinder 174, the former to a zone of the cylinder adjoining spool groove 183 (in which zone radial exhaust hole 184 is now located) and the latter to the space 194 at the rear of spool portion 177. Space 194 communicates with exhaust passage 190 as described above.

Passage 191 leads from cylinder 174 to a portion or chamber 195 in the brake actuating cylinder 196 (FIG. 6) at the rear, or right hand side, of its plunger 197. Passage 192 leads through a passage 111' (shown in FIG. 7 and corresponding to the passage 111 of FIGS. 2 and 3) to a pressure intake member (not shown) which corresponds to the pressure intake member 96 of those figures. It leads thence through a radial bore (similar to bore 94) which opens to a pressure space in cylinder 196 on the left hand side of piston 197.

The lower end of an intensifier or booster plunger 198 is slidably received in the last named bore in the fashion illustrated in FIG. 2. Details of this fluid intake arrangement for the brake actuating cylinder 196 are not illustrated in FIG. 6 of the drawings in order to simplify the disclosure. However, they are the same as those shown in FIG. 2 of the drawings, and their operating relationships are the same, so that reference may be had to FIG. 2 in this connection.

Passage 193, an exhaust passage, is communicated with the upper pressure chamber 199 of a booster or intensifier cylinder 200 which slidably receives the enlarged piston head 201 of plunger 198. Here again the arrangement is similar to that of FIGS. 2 and 3.

In the brake release position of the valve spool shown in FIG. 5, liquid is supplied from sump 188 through conduit 189 to pump 172 and is discharged by the pump through passage 173 to cylinder 174, whence it exits through groove 180 and passage 191 to space 195 in brake actuating cylinder 196. As illustrated in FIG. 7, passage 192 leads to a plunger valve arrangement shown in FIG. 7, which is similar to that shown in FIG. 2, hence corresponding parts are designated by corresponding reference numerals, primed. These include a bore 112' to which passages 192 and 111' open, a port or passage 116' at the end of the bore which opens laterally to pressure chamber 199 of booster cylinder 200, and a spring urged valve plunger 113' whose nose controls port 116', as in the form of FIGS. 2 and 3. Further description of the plunger arrangement is deemed unnecessary.

The passage 111' connects plunger bore 112' with a liquid intake member associated with booster plunger 198 in a manner which, as stated above, is like that of FIG. 2.

Referring to FIG. 6, a rearwardly disposed rod 205 on the brake actuating plunger 197 has a collar 206 secured thereto and is rearwardly guided in a fixed housing member 207. A coil spring 208 acts between the rear of cylinder 196 and the collar 206 to urge the plunger 197 to the right. The rear end of plunger rod 205 abuts the enlarged arm of a lever 209 which is pivoted at 210 on a part of the housing. A rounded seat on lever 209 receives a thrust pin 211 pivoted on one end of the brake band 166. The opposite end of that band engages an adjustable abutment pin 213 on the housing.

Under the conditions described, the solenoid 179 is de-energized and brake actuating plunger 197 is urged toward the left by mild hydraulic pressure in the right hand cylinder portion 195. This pressure is transmitted by the pump 172 through passage 173, spool groove 180 and passage 191. Pressure chamber 199 in booster cylinder 200 is voided through passage 193, rear spool cylinder space 194 and passage 190 to the sump 188. The left hand side of brake cylinder 196 is voided through passage 111', plunger valve cylinder 112', passage 192, spool groove 183, radial spool hole 184, internal spool bore 185, exhaust space 186 and passage 187 to the sump. Brake band 166 is thus positively released from drum 148 and the overdrive unit 13' is in low gear position.

When solenoid 179 is energized, valve spool 175 is drawn to the left, as viewed in FIG. 5. This causes its enlarged rear portion 177 to seal passage 193, hence sealing off pressure chamber 199 in booster cylinder 200. The intermediate enlarged portion 181 passes across passage 192, thereby cutting off its communication with exhaust groove 182 and exposing passage 192 to groove 180 in the valve spool, which groove is at all times open to pump delivery passage 173. Likewise, the enlarged portion 182 seals off groove 180 from passage 191 and exposes the latter to exhaust space 186 and sump passage 187.

In this position of the valve spool, the rear space 195 of brake actuating cylinder 196 is exhausted through passage 191, space 186 and passage 187, while the space on the opposite side of plunger 197 is pressurized in the fashion described above. The ensuing operation is similar to that described in connection with the embodiment of FIGS. 1, 2 and 3.

The modified assembly illustrated in FIGS. 4–7 enables a vehicle to which it is applied to be started by pushing in the event of a battery failure, without involving the locking up of mechanisms or clutches. The parts are so arranged that when the engine and engine driven pump 172 are dead the pressure in cylinder 196 is forced back through the pump under the force of the relatively powerful spring 208 on plunger 197. This spring is strong enough to hold overdrive control brake band 166 sufficiently for transmission of adequate torque to crank the engine. Accordingly, with a dead engine the band 166 is always set, so that when the vehicle is put in direct drive through transmission gear 163 and then pushed, the overrunning unit comprising sprag and clutch race members 150, 159 and 160 will allow the orbit gear 157 to act as a driver. Under these circumstances the planetary arrangement becomes an underdrive, rather than an overdrive. Shaft 145 cranks the motor through fluid coupling 10' at a slight reduction, as compared to direct drive through unit 13'.

As soon as the engine starts, valve spool 175, being in the position illustrated in FIG. 5, will direct hydraulic pressure into passage 191 and the right hand chamber 195 of cylinder 196 (FIG. 6). This will retract plunger 197 against the force of spring 208 and release band 166 from drum 148. So long as the engine continues to run at a speed less than the critical governor speed, the drive will be direct through shaft 145, locked clutch elements 150, 160, 159 and transmission input shaft 16' to the rear axle of the vehicle.

A governor-controlled shifting to overdrive has been referred to above, and a suitable arrangement to this end is illustrated in FIG. 6 of the drawings, to which reference is now directed. This governor operation controls energization and deenergization of a solenoid, which in turn controls the shifting of a valve spool. Obviously since this may be either the spool 122 of the adaptation of FIGS. 1–3, or the spool 175 of the adaptation of FIGS. 4–7, the electrical provisions illustrated in FIG. 6 are equally adaptable to both of these embodiments. In the interest of simplicity they have been illustrated only in the last named figure.

For a better understanding of objectives attained by the improved arrangement, it should be understood that it is desirable for the operator of the vehicle to have some choice or descretion in deciding when and where the overdrive unit is to be placed in overdrive position, rather than being at all times arbitrarily controlled in this matter by the action of a governor coming into operation at a definite, set speed. In other words, it is desirable that a minimum limit for overdrive be automatically determined by a governor, but that the shift to overdrive gear not be completed until the operator decides. This result is had in present day arrangements by positive dog clutches controlled by solenoids and blocker arrangements. However, a time interval must elapse during which the engine decelerates before the shift is completed. The result is that if the driver becomes impatient of the time delay he can, and generally does, accelerate before the shift is completed. This situation is annoying at times and undesirable.

It is also desirable that a lock up arrangement be provided for the overdrive unit, of the type described above, so that the engine can be started by pushing the car. This is done on present day installations by dental clutches operated by a secondary control through the agency of a long Bowden wire and an operating button on the dashboard of the vehicle.

The results referred to above are accomplished by the means illustrated in FIG. 6. In that figure, the reference numeral 218 designates a conventional electrical governor driven by a pair of gears 219, 220 from the output shaft 77' (or 77) at the rear end of the synchromesh transmission. This governor is set to operate at any predetermined speed, say from twenty-thirty miles per hour, as the case may require, to set the system for overdrive operation. An automatic switch 221 is provided which has its contacter 222 mechanically controlled from the usual speed selector hand lever or levers of the synchromesh transmission 14' (or 14) or a fork or fork controlled thereby (see FIG. 1A) which move the transmission gears into mesh. This switch is provided with contact points 223, 223', and 224. Its automatic operation is later described.

The contacter 222 is connected by a lead 225 with the ground terminal of solenoid 179 (or solenoid 127), and a lead 226 connects switch contact 223 with a contact arm 227 of governor 218. This arm is adapted to complete a circuit through a governor terminal 228, as a result of its mechanical movement from gears 219, 220 when a predetermined, set shift over speed is reached.

A grounded battery 229 has a supply lead 230 electrically connecting the same with a fixed contact 231 and with a relay coil 232 mounted on a fixed support 233. A conducting armature 234 for relay 232 is appropriately pivated for coaction with the relay coil. It is connected through lead 236 with the contact 228 of governor 218.

Armature 234 has an insulating block 237 thereon which carries a contact 238 adapted to engage the fixed, battery-connected contact 231 when the armature is drawn in clockwise direction by relay 232. Contact 238 is connected through lead 240 with the hot terminal of solenoid 179.

The armature 234 also carries, in electrically conducting relation thereto, a contact 241 which is adapted to engage one or the other of a pair of spaced, fixed contacts 242, 243 under the control of relay 232. A coil spring 244, secured to an insulated free end of armature 234 and to the fixed support 233, acts to urge the armature in counterclockwise direction.

The fixed contact 242 referred to above is connected by a lead 245 with one terminal of a normally open switch 246. This switch has an operating button 247 and is grounded at 248. Switch button 247 is adapted to be actuated by one arm of a bell crank 249 medially pivoted at 250 on the floorboard of the vehicle. A link 251 and coil spring 252 normally urge the bell crank in clockwise direction. The other arm of bell crank 249 is operated through a connecting link 251' by the accelerator pedal 252' of the vehicle, which is pivoted to the floorboard at 253. The purpose of these mechanical connections will appear after further description of the character and operation of electrical units which are controlled thereby.

The second fixed contact 243 with which the swinging contact 241 coacts is connected by a lead 254 with a terminal 256 of a normally closed toggle switch 257. Switch 257 is in closed condition in the position illustrated in FIG. 6, in which it engages the upper flange of a channel element 258 which is bracket-supported on the floorboard of the automobile. Switch 257 is pivotally supported on the pedal-operated arm of bell crank 249, so that when the pedal 252′ is thrust down past the full open throttle position the toggle switch strikes the lower flange of channel element 258, being thus tilted to an open position. The second terminal of switch 257 is grounded.

The second contact 243 of the two fixed contacts 242, 243, in addition to being electrically connected with switch 257, is electrically connected in parallel with that connection, through a lead 260 to the second contact 224 of switch 221.

Toggle switch 257 is so arranged that when the throttle pedal 252′ is operated normally during the operation of the vehicle the switch, in circuit-closing condition, travels back and forth in the space between the upper and lower flanges or arms of channel element 258. When the throttle is closed, a button on the switch contacts the upper flange, restoring the switch to normal closed condition in the event it has been opened. On a downstroke of pedal 252′ past wide open throttle position another button on switch 257 strikes the lower flange of element 258. This opens the switch, in which open condition the switch remains during further back and forth operation between the flanges of element 258 until the throttle is closed. The switch is then reclosed in the manner described.

Normally open switch 246 only closes when the throttle is fully closed, i.e., when pedal 252′ is fully raised, at which time bell crank 249 engages and actuates button 247, thus to close the switch and allow current to flow through leads 245 and 248 to ground.

An understanding of the operation of the modified governor shift control system just described can best be conveyed by a description of a typical series of manipulations attending the usual, day to day use of a motor vehicle in which the assembly is installed. Assuming that an operator is taking the automobile out of the garage, he first turns on the ignition and steps on the starter. At this time brake band 166 is already riding drum 148 and the overdrive unit is in locked position, but the transmission 141 is in neutral position. The engine is cranked by the starter to running condition. Incidentally, the fluid coupling 10′ makes it possible to so crank the engine even if it is in gear at the transmission.

After the engine has warmed up properly, the driver, by applying brake band 167 to the associated drum 154, in the manner described in connection with FIG. 1, halts the coupling-driven overdrive shaft from rotation under hydraulic drag during the idling period. The driver may then manually engage transmission 14′ in either forward or reverse ratio, as desired. For the purpose of this illustration, it will be assumed that the vehicle is to move forward and is thus engaged by the driver in low gear at transmission 14′, by the means shown in FIG. 1A. The vehicle moves forward at low speed. Only a low gear shifter 261 is shown, however the invention contemplates automatic switch control by a plurality of shifters as well.

As mentioned above, movement of a shifter fork of transmission 14′ mechanically governs movement of the contactor 222 of switch 221. As the last fraction of an inch of transmission gear shift movement is completed, contactor 222 is thus operated to preset the ground circuit of solenoid 179 through lead 225, contact 224 (as shown in dotted line), lead 260, lead 254 and normally closed toggle switch 257 (in the position of the latter illustrated in FIG. 6). It will be observed that the circuit through governor is interrupted as a safety or emergency feature of operation in this gear ratio.

Switch 221 is of a partially automatic character, being so arranged and interlocked with the selector lever or levers of transmission 14′, or the forks controlled thereby, that its contacter 222 is returned to a neutral point 223′ on the switch body and remains at that point just as soon as the transmission is shifted out of gear and into neutral, as will be later described. In low, intermediate and reverse gear ratios the contacter engages contact 224, as described.

When the operator reaches a speed at which he wishes to engage the transmission 14′ in high gear he manipulates the transmission selector lever to high gear position. Through the mechanical connection of the transmission selector or shifter to switch contactor 222, the latter makes contact with the contact 223 in its last fraction of an inch of travel, as shown in solid line in FIG. 6. A ground circuit is thus partially established for solenoid 179 through lead 225, contacter 222, contact 223 and lead 226 to governor contact arm 227. If at this time the governor 218 has reached the critical speed for shift to overdrive, governor contact arm 227 is caused to engage its fixed contact 228. If the governor has not yet reached overdrive speed when transmission 14′ is shifted to high, and assuming that the driver is accelerating the car, the latter remains in direct drive. As soon as the governor contacts 227, 228 are closed upon attainment of the critical speed, the circuit for solenoid 179 would normally further be completed through the lead 236, conducting armature or arm 234 of relay 232 contacts 241 and 242, lead 245, switch 246 to lead 248 and ground. However, since it has been assumed that the driver is accelerating the car, the solenoid circuit just described is seen to be interrupted at normally open switch 246, due to disengagement of bell crank 249 from the operating button 247 of that switch.

Hence closing of governor contacts 227, 228 will have no effect and the driver will continue to proceed in direct drive as long as he is holding down accelerator pedal 252′. When he decides to place unit 13′ in overdrive, assuming the governor 218 is still at or above a critical overdrive speed, the driver merely needs to release pedal 252′, closing the throttle, whereupon the solenoid circuit is completed through then energizing closed switch 246 and an energizing circuit portion including the connections recited above to energize solenoid 179.

Relay 232 is energized at the same instant, shifting the solenoid ground circuit through an engagement of armature contact 241 with fixed contact 243, rather than with fixed contact 242. This transfers control of the solenoid to toggel switch 257 and a holding circuit portion including the same. The solenoid energizing circuit is further shifted, upon energization of relay 232, by engaging the contact 238 (carried on but insulated from armature 234) with the fixed, battery-connected contact 231. Solenoid 179 now operates through the hydraulic mechanism described above to actuate brake band 166 and halt drum 148, thus placing overdrive unit 13′ in overdrive position.

In this condition, as long as the driver operates the car in a normal manner above the critical overdrive speed of governor 218, the relay 232 and solenoid 179 will remain energized and overdrive will continue. However, if at any time the driver wishes to overrule the overdrive and return to direct drive, he need only depress accelerator 252′ past its wide open throttle position. Bell crank 249 then carries toggle switch 257 downwardly to the dotted line position of FIG. 6, in which it engages the lower flange of the channel member 258, opening the ground circuit of solenoid 179 at the open switch. The solenoid is thereby de-energized, as well as relay 232. While remaining in high gear, the transmission 14′ returns to direct drive through unit 13′.

Restoration of overdrive is accomplished by simply fully elevating the pedal 252′, thereby causing switch 246 to close, with resultant energization of solenoid 179 and relay 232, as at original setting. However, at this time switch 257 also contacts the upper flange of member 258, causing it to be closed and transfer ground of the relay from energizing switch 246 to holding switch 257.

In the event the vehicle decelerates to a point where governor 218 separates contact 227, 228, the brake band 166 is immediately released by interruption of the solenoid circuit. Direct drive then takes place through the unit 13'.

In the further event that the driver is in a deep climb upgrade, taxing the full capacity of the engine and calling for the lowest ratio available, the driver may shift transmission 14' into low gear but hold its selector lever from its full detent position, so that contactor 222 of switch 221 is caused to remain at the intermediate, neutral position 223'. The result is that a full, low transmission ratio, without overdrive in the unit 13', is available. It is desirable in ascending a difficult incline that the engine be placed back in the next ratio as soon as sufficient momentum has been attained. To do this, the driver simply allows the transmission gear selector lever to return to its detent position, which enables brake band 166 to be applied to drum 148. This places the overdrive in effect and thus achieves a power shift of one ratio higher, upon which further climb may be continued. It is seen that a split ratio between low and second gear is thus accomplished without power interruption.

FIGS. 8, 9, 10 and 10A illustrate a proposed arrangement for shifting the contacter 222 of switch 221 in response to operation of the selector means of transmission 14 or (14'), which is depicted as having two selector levers controlling three forward and one reverse ratios. The reference numerals 262 and 263 designate the respective selector levers, each of which is keyed to a shaft 264 by which the operation of the shifter forks of the transmission is accomplished. It is not deemed necessary to illustrate the shaft-shifter fork connection further than as depicted in FIG. 1A, since the arrangement is entirely conventional in this respect and will be readily understood by those skilled in the art. Levers 262, 263 are each provided with a segmental rear extension 265 which carries an upwardly facing, shaped cam surface, designated 266 in the case of the lever 262 and 267 in the case of the lever 263. A sheet metal or equivalent channel shaped switch control arm 268 is pivoted at 269 on a suitable fixed support, this arm being provided with opposed downwardly depending cam follower flanges 270, 271. It is urged by a coil spring 272 in a direction tending to engage flanges with the cams 266, 267, respectively.

The cam 266 on lever 262, which controls second or intermediate speed and high speed ratios, is shaped to provide a depression 273 and, in spaced relation to the right thereof, a rise 274. The cam is flat in the portion 275 between the depression and rise. The other cam 267, which controls reverse and low speed ratios, is equipped with rises 276, 277 at opposite ends thereof and with a depression 278 midway therebetween. Cam 267 is flat in the zones between depression 278 and rises 276, 277, respectively.

A forwardly projecting terminal tongue 280 on arm 268 (see FIGS. 8 and 9) is provided with an upwardly projecting button 281 which is in vertical alignment with a contact button 282 carried on the contacter 222 of switch 221. The contacter is urged downwardly by a spring 283.

When the transmission selector levers 262, 263 are in neutral position with the midpoints of cams 266, 267 disposed beneath the respective flanges 270, 271 as shown in FIG. 10, the follower flange 270 on arm 268 rides the flat, intermediate neutral portion of cam 266 and the opposite follower flange 271 is thus held suspended over the central depression 278 of the other cam 267. If the selector lever 263 is now shifted to low speed position, i.e., counterclockwise in FIG. 9 and to the left in FIGS. 10 and 10A, the flat portion of cam 267 to the right of depression 278 travels beneath follower flange 271 until the final increment of selector movement. As this movement "x" (FIG. 10) is completed, cam rise 277 passes under flange 271 and lifts arm 268 from its neutral position, as shown in dotted line in FIG. 10. Button 281 contacts switch button 282 and raises contactor 222 from a neutral position, in which it has been held in engagement with contact 223' by the cam flat, into engagement with the contact 224. The same effect takes place when arm 263 is shifted in the opposite direction from neutral to reverse gear position. In this case cam rise 276 raises arm 268. In either of these two speeds the possibility of completion of an electrical circuit through governor 218, and placing of the system in overdrive condition, is prevented.

When the intermediate-high speed selector lever 262 is manipulated to second speed position, i.e., counterclockwise in FIG. 9 and to the left in FIGS. 10 and 10A, cam rise 274 has the same effect of elevating arm 268 and engaging contacter 222 with contact 224. The safety lock-out of the overdrive obtains in this speed also. When lever 262 is shifted oppositely to high speed position, cam depression 273 comes into alignment, in the last increment of travel of the lever, with follower flange 270, as indicated in FIG. 10A. Since lever 263 is in neutral position, the follower flanges 270, 271 are now aligned with cam depressions 273, 278, respectively. Switch contacter 222 is lowered into engagement with contact 223, whereupon control is again turned over to the governor 218.

The above described type of automatic governor cut-in and lock-out operation from the transmission is also adapted for association with transmission having more or less than two selector members by an obvious simplification or multiplication of the means shown in FIGS. 8 through 10A.

This application is a division of my copending application, Serial No. 245,721, filed September 8, 1951, now Patent No. 2,774,256.

I claim:

1. An electrical control including a biased movable contact, an arm biased in the same general direction as said contact operatively associated with said contact to move the same, said arm being provided with spaced cam-actuable means, and camming means operatively associated with each of said cam-actuable means, said camming means being operable independently of one another and each being provided with a camming surface in contact with a cam-actuable means, said surfaces being defined by variant camming portions adapted to control variable movement of said arm and said contact in cooperation with the biasing thereof, some of said portions of separate surfaces being cooperatively operable with one another and others of said portions of separate surfaces being independently operable.

2. An electrical control including a movable contact, an arm operatively associated with said contact to move the same, said arm being provided with a pair of spaced cam-actuable means, and a separate camming means operatively associated with each of said cam-actuable means, said camming means being operable independently of one another and each being provided with a horizontal camming surface in contact with a cam-actuable means, one of said camming surfaces being provided exclusively with a raised camming portion and a depressed camming portion spaced from one another by an intermediate camming portion, the other of said camming surfaces being provided exclusively with a pair of raised camming portions spaced from one another by intermediate camming portions being in turn separated by a depressed camming portion, said portions being adapted to control variable movement of said arm and said contact, some of said portions of separate surfaces being cooperatively operable with one another.

3. An electrical control including a biased movable contact, an arm biased in the same general direction as said contact operatively associated with said contact to move the same, said arm being provided with a pair of spaced cam-actuable means, and a separate camming means operatively associated with each of said cam-actuable means, said camming means being operable independently of one another and each being provided with a camming surface in contact with a cam-actuable means, one of said camming surfaces being provided with a raised camming portion and a depressed camming portion spaced from one another by an intermediate camming portion, the other of said camming surfaces being provided with a pair of raised camming portions spaced from one another by intermediate camming portions being in turn separated by a depressed camming portion, said portions being adapted to control variable movement of said arm and said contact in cooperation with the biasing thereof, some of said portions of separate surfaces being cooperatively operable with one another.

4. An electrical control including a biased movable contact, an arm biased in the same general direction as said contact operatively associated with said contact to move the same, said arm being provided with a pair of spaced cam-actuable means, and a separate camming means operatively associated with each of said cam-actuable means, said camming means being operable independently of one another and each being provided with a camming surface in contact with a cam-actuable means, one of said camming surfaces being provided with a raised camming portion and a depressed camming portion spaced from one another by an intermediate camming portion, the other of said camming surfaces being provided with a pair of raised camming portions spaced from one another by intermediate camming portions being in turn separated by a depressed camming portion, said portions being adapted to control variable movement of said arm and said contact in cooperation with the biasing thereof, said depressed portions being cooperatively operable with one another.

5. A switch operating arrangement for a switch arm movable in a substantially vertical direction in successive contact with a series of substantially vertically spaced circuit contacts, resilient means biasing said switch arm in a downward direction, a vertically movable control arm operatively associated with said switch arm to move the same upwardly against the biasing action of said resilient means, further resilient means biasing said control arm in a downward direction in complement with the biasing action of said first named resilient means, said control arm being provided with a downwardly directed pair of cam-actuated means in spaced relation, and a pair of independently operable camming means each being separately in contact with one of said cam-actuated means, said camming means being movable in a substantially horizontal plane and being provided with upwardly directed camming surfaces in contact with said cam-actuated means, said camming means supporting said control arm against the biasing of its resilient means and adapted for moving said control arm and said switch arm against and with the biasing action of said resilient means to move said switch arm from one circuit contact to another.

6. A switch operating arrangement for a switch arm movable into successive contact with a series of spaced circuit contacts, resilient means biasing said switch arm, a movable control arm operatively associated with said switch arm to move the same against the biasing action of said resilient means, said control arm being adapted to change the position of said switch arm with respect to said circuit contacts, further resilient means biasing said control arm in complement with the biasing action of said first named resilient means, said control arm being provided with a pair of cam-actuated means in spaced relation, and a pair of independently operable camming means each being separately in contact with one of said cam-actuated means, said camming means being provided with camming surfaces in contact with said cam-actuated means, one of said camming surfaces being provided with a raised camming portion and a depressed camming portion spaced from one another by an intermediate camming portion, the other of said camming surfaces being provided with a pair of raised camming portions spaced from one another by intermediate camming portions being in turn separated by a depressed camming portion, said portions being adapted to control variable movement of said control arm and said switch arm in cooperation with the biasing thereof, some of said portions of separate surfaces being cooperatively operable with one another.

7. A switch operating arrangement for a switch arm movable into successive contact with a series of spaced circuit contacts, resilient means biasing said switch arm, a movable control arm operatively associated with said switch arm to move the same against the biasing action of said resilient means, said control arm being adapted to change the position of said switch arm with respect to said circuit contacts, further resilient means biasing said control arm in complement with the biasing action of said first named resilient means, said control arm being provided with a pair of cam-actuated means in spaced relation, and a pair of independently operable camming means each being separately in contact with one of said cam-actuated means, said camming means being provided with camming surfaces in contact with said cam-actuated means, one of said camming surfaces being provided with a raised camming portion and a depressed camming portion spaced from one another by an intermediate camming portion, the other of said camming surfaces being provided with a pair of raised camming portions spaced from one another by intermediate camming portions being in turn separated by a depressed camming portion, said portions being adapted to control variable movement of said control arm and said switch arm in cooperation with the biasing thereof, said depressed portions being cooperatively operable with one another.

8. A switch operating arrangement for a switch arm movable into successive contact with a series of spaced circuit contacts, resilient means biasing said switch arm, a movable control arm operatively associated with said switch arm to move the same against the biasing action of said resilient means, further resilient means biasing said control arm in complement with the biasing action of said first named resilient means, said control arm being provided with a pair of cam-actuated means in spaced relation, and a pair of independently operable camming means each being separately in contact with one of said cam-actuated means, said camming means being provided with camming surfaces in contact with said cam-actuated means, one of said surfaces being defined by a central portion having at one end thereof a raised portion and at the other end thereof a depressed portion, the other of said surfaces having a centrally located depressed portion associated wtih intermediate portions at either end thereof, and raised portions at the ends of said last named surface, the raised portions of said surfaces each being adapted to separately move said control arm and said switch arm against the biasing of said resilient means to bring said switch arm into contact with one of said circuit contacts, the intermediate portions of said surfaces each being adapted to separately position said switch arm by means of said control arm in contact with another circuit contact, and the depressed portions of said surfaces being adapted to cooperate with one another to allow movement of said control arm and said switch arm in response to the biasing action of said resilient means to bring said switch arm into contact with the remaining circuit contact.

9. A switch operating arrangement for a switch arm movable in a substantially vertical direction into successive contact with a series of three vertically spaced circuit contacts, resilient means biasing said switch arm in a downward direction, a vertically movable control arm operatively associated with said switch arm to move the same upwardly against the biasing action of said resilient means, further resilient means biasing said control arm in a downward direction in complement with the biasing action of said first named resilient means, said control arm being provided with a downwardly directed pair of cam-actuated means in spaced relation, and a pair of independently operable camming means each being separately in contact with one of said cam-actuated means, said camming means being provided with upwardly directed camming surfaces in contact with said cam-actuated means, one of said surfaces being defined by a central portion having at one end thereof a raised portion and at the other end thereof a depressed portion, the other of said surfaces having a centrally located depressed portion associated with intermediate portions at either end thereof, and raised portions at the ends of said last named surface, the raised portions of said surfaces each being adapted to separately raise said control arm and said switch arm against the biasing of said resilient means to bring said switch arm into contact with the uppermost of said circuit contacts, the intermediate portions of said surfaces each being adapted to separately position said switch arm by means of said control arm in contact with the middle circuit contact, and the depressed portions of said surfaces being adapted to cooperate with one another to allow lowering of said control arm and said switch arm in response to the biasing action of said resilient means to bring said switch arm into contact with the lowermost circuit contact.

10. An electrical control including a movable contact, an arm operatively associated with said contact to move the same, said arm being provided with a pair of spaced cam-actuable means, and a separate camming means operatively associated with each of said cam-actuable means, said camming means being operable independently of one another and each being provided with a horizontal camming surface in contact with a cam-actuable means, one of said camming surfaces being provided exclusively with a raised camming portion and a depressed camming portion spaced from one another by an intermediate camming portion, the other of said camming surfaces being provided exclusively with a pair of raised camming portions spaced from one another by intermediate camming portions being in turn separated by a depressed camming portion, said portions being adapted to control variable movement of said arm and said contact, said depressed portions being cooperatively operable with one another.

11. A switch operating arrangement for a switch arm movable into successive contact with a series of spaced circuit contacts, a movable control arm pivotally mounted on a base support and operatively engaged at a point spaced from its pivotal mounting with said switch arm and adapted to move the same between said contacts upon pivoting of said control arm, said control arm being provided with a pair of spaced cam-actuated means in spaced relation with its pivotal mounting and point of engagement with said switch arm, and a pair of independently operable camming means each being separately in contact with one of said cam-actuated means, said camming means supporting said control arm and adapted for moving said control arm to move said switch arm from one circuit contact to another, said camming means each being defined by variant camming surface portions, certain of the variant surface portions of both of said camming means being cooperatively operable with one another while others of said surface portions are independently operable.

References Cited in the file of this patent

UNITED STATES PATENTS

| | | |
|---|---|---|
| 1,416,973 | Piersen | May 23, 1922 |
| 1,748,439 | Bugh | Feb. 25, 1930 |
| 2,468,974 | Hammer | May 3, 1949 |
| 2,497,416 | Peckham | Feb. 14, 1950 |
| 2,500,796 | Bullard | Mar. 14, 1950 |
| 2,513,950 | Mares | July 4, 1950 |
| 2,713,092 | Rucks et al. | July 12, 1955 |

OTHER REFERENCES

Product Engineering, October 1949, pp. 126 to 130, Differential Mechanisms.

Product Engineering, November 1949, pp. 121–131, Differential Mechanisms.